United States Patent [19]

Suzuki et al.

[11] 4,158,396

[45] Jun. 19, 1979

[54] ELECTRONIC WEIGHT MEASURING DEVICE

[75] Inventors: Seiji Suzuki; Yoshihisa Nishiyama, both of Shizuoka; Tohru Kitagawa, Mishima, all of Japan

[73] Assignee: Tokyo Electric Co., Ltd., Tokyo, Japan

[21] Appl. No.: 897,363

[22] Filed: Apr. 18, 1978

[30] Foreign Application Priority Data

| Apr. 22, 1977 | [JP] | Japan | 52-46606 |
| Apr. 22, 1977 | [JP] | Japan | 52-46607 |
| Apr. 22, 1977 | [JP] | Japan | 52-46608 |
| Aug. 10, 1977 | [JP] | Japan | 52-95684 |
| Aug. 12, 1977 | [JP] | Japan | 52-96790 |

[51] Int. Cl.$^2$ ............................................. G01G 3/14
[52] U.S. Cl. ........................... 177/210 R; 177/DIG. 3; 177/210 FP
[58] Field of Search ............. 177/210 FP, 211, 210 R, 177/DIG. 3

[56] References Cited

U.S. PATENT DOCUMENTS

| 3,831,687 | 8/1974 | Maffia et al. | 177/211 |
| 3,872,936 | 3/1975 | Baumann et al. | 177/DIG. 3 |
| 4,044,846 | 8/1977 | Matilainen | 177/DIG. 3 |
| 4,063,604 | 12/1977 | Rock | 177/210 FPX |

*Primary Examiner*—George H. Miller, Jr.
*Attorney, Agent, or Firm*—Flynn & Frishauf

[57] ABSTRACT

An electronic weight measuring device comprises a load cell to produce a voltage signal corresponding to the weight of load applied, an amplifier circuit for amplifying the output signal of the load cell, an A/D converter circuit for converting the output signal of the amplifier circuit into a digital signal, a counter for counting the number of clock pulses corresponding to the output signal of the A/D converter circuit, a microcomputer for deriving a weight indicating signal from the count output signal of the counter, and a display unit for displaying the weight indicating signal from the microcomputer.

The electronic weight measuring device further includes a bias circuit to apply a bias voltage to the amplifier circuit so as to reduce to a zero level the output signal produced from the amplifier circuit when it has received from the load cell an output signal corresponding to ½ of the rated weight, and the A/D converter circuit produces a digital output signal corresponding to the absolute value of a positive or negative output signal from the amplifier circuit.

22 Claims, 8 Drawing Figures

ELECTRONIC WEIGHT MEASURING DEVICE

BACKGROUND OF THE INVENTION

This invention relates to an electronic weight measuring device provided with a load cell.

Heretofore, there have generally been known electronic weight measuring devices having a load cell and an A/D converter for converting an output signal of the load cell into a digital value. In an electronic weight measuring device of this type, the load cell produces a unipolar, e.g. positive, output signal corresponding to the weight of load applied, while the A/D converter produces a digital signal corresponding to the positive output signal from the load cell. The digital signal from the A/D converter is processed on a microcomputer by a well-known method, and then supplied to a display unit.

Thus, according to the prior art device, produced from the load cell is e.g., a positive output voltage within a range corresponding to a predetermined measuring range, which is supplied as an input signal to the A/D converter, so that it is required that the range of the input voltage of the A/D converter be enlarged in proportion to the measuring range, that is, it is required that the resolution power of the A/D converter be made larger than that of the weight measuring device.

An object of this invention is to provide an electronic weight measuring device which includes an A/D converter for converting positive and negative input signals into digital signals and which supplies the A/D converter with an input signal within a range defined by positive and negative values and corresponding to a weight measuring range, thereby reducing the range of the absolute value of the input signal for the A/D converter.

SUMMARY OF THE INVENTION

According to an embodiment of the invention, there is provided an electronic weight measuring device comprising a source terminal, a load cell connected with the source terminal and producing an output signal corresponding to the weight of load to be measured within a predetermined weight measuring range, a signal processor circuit to process the output signal of the load cell and produce an output signal corresponding to the output signal of the load cell, bias means to supply the signal processor circuit with a bias signal for setting the variable range of the output signal of the signal processor circuit corresponding to the weight measuring range to a range defined by positive and negative values, A/D converter means for converting the output signal of the signal processor circuit into a digital signal, and a load weight indicating signal generator circuit receiving the output signal of the A/D converter means and deriving an output signal to indicate the load to be measured from the output signal of the A/D converter means.

Figure 1:
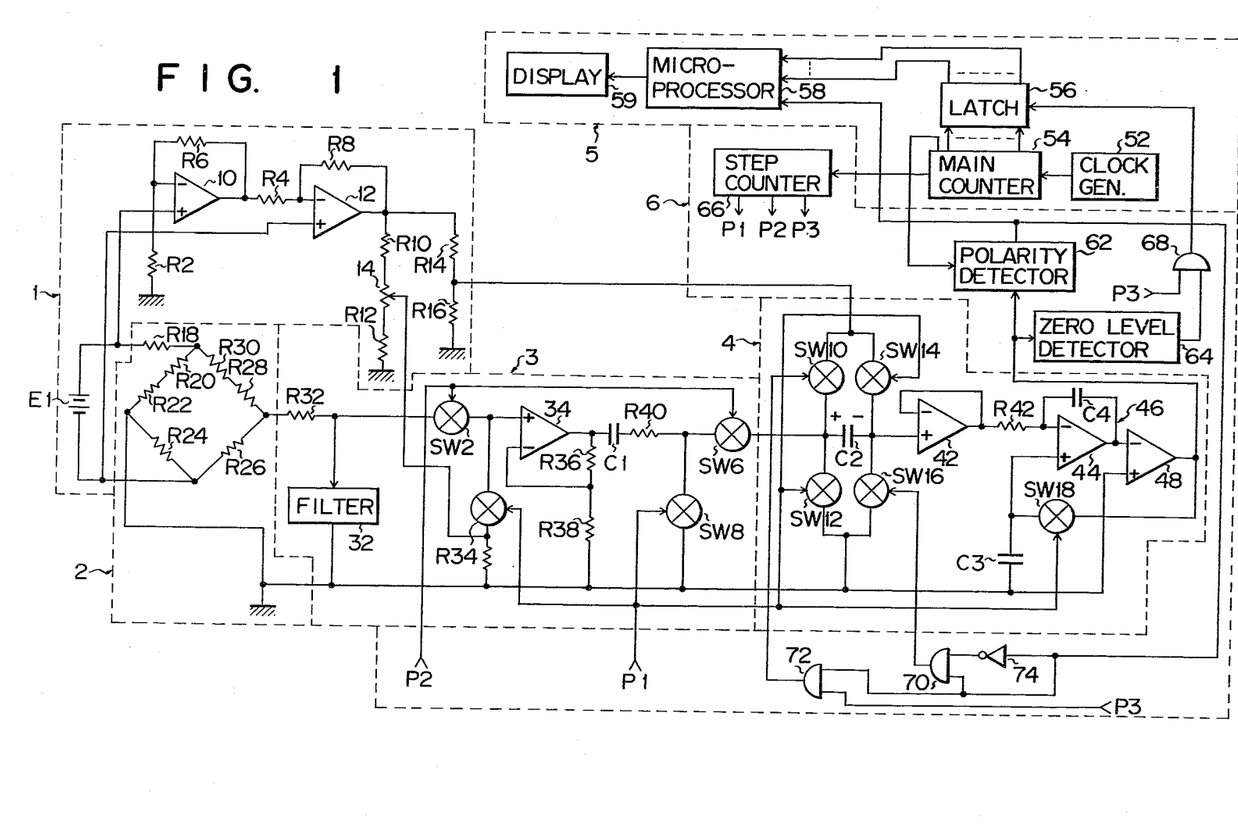
FIG. 1 is a circuit diagram of an electronic weight measuring device according to an embodiment of this invention.

Referring now to FIG. 1, there is shown an electronic weight measuring device which includes a power circuit 1, a load cell 2, a signal processor circuit 3 to receive a bias voltage from the power circuit 1 and a weight indicating signal from the load cell 2 and produce an analog signal corresponding to the weight indicating signal, an A/D converter circuit 4 for converting the analog signal from the signal processor circuit 3 into a digital signal, a counter/display circuit 5 for counting and displaying the digital signal from the A/D converter circuit 4, and a control circuit 6 for controlling switches included in the signal processor circuit 3 and A/D converter 4 as well as the counter/display circuit 5.

The power circuit 1, load cell 2, and signal processor circuit 3 are diposed in close vicinity to one another within a single case as mentioned later, and are always kept under the same temperature condition.

The power circuit 1 is provided with a DC power source E1, an operational amplifier 10 with an noninverted input terminal connected with the positive terminal of the DC power source E1 and an inverted input terminal earthed through a resistor R2, and an operational amplifier 12 with a noninverted input terminal connected with the negative terminal of the DC power source E1 and an inverted input terminal connected with the output terminal of the amplifier 10 through a resistor R4. Connected between the inverted input terminal and output terminal of the amplifiers 10 and 12 are resistors R6 and R8, respectively.

The output terminal of the amplifier 12 is earthed through a resistor R10, a potentiometer 14 and a resistor R12, as well as through resistors R14 and R16. The movable terminal of the potentiometer 14 is connected with the signal processor circuit 3, while the junction of the resistors R14 and R16 is connected with the A/D converter circuit 4.

The load cell 2 includes a resistor R18 and a bridge circuit formed of resistors R20, R22, R24, R26, R28 and R30 connected across the DC power source E1 through the resistor R18. The resistor R18 is to compensate the variation, due to the temperature change, in the Young's modulus of the load receiving portion, which is subject to a stress in proportion to the applied weight of load. As is generally known, the resistors R22, R24, R26 and R28 vary their resistances according to the weight of the load on a load receiving plate (not shown). In this embodiment the device is so constructed that the resistances R22 and R26 are lowered and the resistances R24 and R28 are raised as the weight of load increases. The resistor R20 is designed to set the output voltage of the load cell 2 or the voltage at the junction of the resistances R26 and R28 at a pedetermined level, when no load is applied. Meanwhile, the resistance R30 is to compensate the variations in resistances of the resistors R22, R24, R26 and R28 due to temperature change. These resistances R20 and R30 will not change with variations in the applied load.

The junction of the resistors R22 and R24 is earthed, while the junction of the resistors R26 and R28 is connected with a resistor R32 of the signal processor circuit 3. The other terminal of the resistor R32 is earthed through a filter 32 and also is connected with the noninverted input terminal of an operational amplifier 34 through an analog switch SW2 composed of e.g. an FET. The noninverted input terminal of the operational amplifier 34 is earthed through an analog switch SW4 and a resistor R34, the output terminal is earthed through resistors R36 and R38, and the inverted input terminal is connected with the junction of these resistors R36 and R38. Also, the output terminal of the amplifier 34 is connected with the A/D Converter circuit 4 through a capacitor C1, a resistor R40 and an analog switch SW6. The junction of the resistor R40 and switch SW6 is earthed through an analog switch SW8, while the junction of the switch SW4 and resistor R34 is connected with the movable terminal of the potentiometer 14.

The switch SW6 of the signal processor circuit 3 is connected with the noninverted input terminal of a buffer amplifier 42 through a capacitor C2 of the A/D converter circuit 4. One end of the capacitor C2 is connected with the junction of the resistors R14 and R16 through an analog switch 10 and earthed through an analog switch SW16, while the other end is connected with the junction of the resistors R14 and R16 through an analog switch SW14 and earthed through an analog switch SW16. These analog switches SW10, SW12, SW14 and SW16 and the capacitor C2 form a reference voltage generator circuit to supply a reference voltage to an integration circuit 46 as mentioned later.

The output terminal of the operational amplifier 42 is connected with the inverted input terminal thereof as well as with the inverted input terminal of an operational amplifier 44 through a resistor R42. The noninverted input terminal of the operational amplifier 44 is earthed through a capacitor C3. The operational amplifier 44, in cooperation with a capacitor C4 connected between the inverted input terminal and output terminal thereof, forms the integration circuit 46. The output terminal of the amplifier 44 is connected with the inverted input terminal of an operational amplifier 48 to function as a comparator having an earthed noninverted input terminal. The operational amplifier 48 produces a positive or negative signal when the voltage applied to the inverted input terminal is negative or positive, respectively. The output terminal of the operational amplifier 48 is connected with the noninverted input terminal of the operational amplifier 44 through an analog switch SW18, as well as with a polarity detector 62 and a zero level detector 64 of the control circuit 6.

The counter/display circuit 5 is provided with a clock pulse generator 52 to produce clock pulses at e.g. 100 kHz and a main counter 54 to the clock pulses from the clock pulse generator 52. The main counter 54 supplies a step counter 66 of the control circuit 6 with one pulse per 10,000 counts, for example, is reset to zero on completion of 40,000 counts, and resumes counting from zero count. The step counter 66 is switched in response to output pulses from the main counter 54, producing pulse signals P1, P2 and P3 as shown in FIG. 2.

Figure 2:
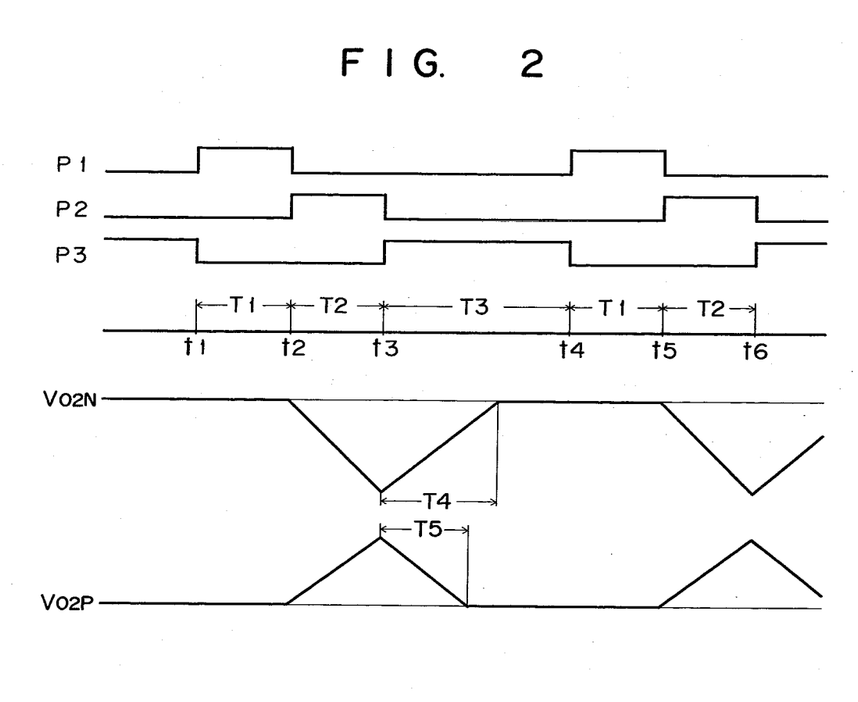
FIG. 2 shows several pulse configurations for illustrating the operation of the electronic weight measuring circuit shown in FIG. 1.

Further, as shown in FIG. 2, the main counter 54 supplies an excitation pulse P4 to the polarity detector 62 immediately before completion of 20,000 counts, e.g. at 19,500th count. Consequently, the polarity detector 62 identifies the polarity of the output voltage from the operational amplifier 48, and produces a high-level output signal when such output voltage of the amplifier 48 is positive or zero, that is, when the output signal of the integration circuit 46 is negative or zero. The main counter 54 is connected with a latch circuit 56, which stores the numerical contents of the main counter 54 in response to an output pulse supplied from the zero level detector 64 through an AND gate 68 to receive at one input terminal the output pulse P3 from the step counter 66 when the zero level detector 64 detects that the output signal of the operational amplifier 48 is reduced to the zero level. Both the stored information of the latch circuit 56 and the output signal of the polarity detector 62 are supplied to a microprocessor 58, where they are processed by a well-known method. Then, a weight indicating information corresponding to the input signal is produced from the microprocessor, and displayed on a display unit 59.

When the content of the main counter 54 is reset to zero, the step counter 66 supplies the pulse P1 to the analog switches SW4, SW8, SW12, SW14 and SW18 in response to an output pulse from the main counter 54, thereby closing these switches. When the count in the main counter becomes 10,000, the step counter 66 supplies the pulse P2 to the analog switches SW2 and SW6 in response to an output pulse from the main counter 54, thereby closing these switches. In this case the pulse P1 is reduced to a low level, and the analog switches SW4, SW8, SW12, SW14 and SW18 are opened. Subsequently, when the count in the main counter 54 becomes 20,000, the step counter 66 supplies the pulse P3 to the AND gate 68 as well as to AND gates 70 and 72 in response to an output pulse from the main counter 54. The AND gate 70 receives at the other input terminal the output signal of the polarity detector 62 through an inverter 74, supplying its output signal to the analog switch SW16. On the other hand, the AND gate 72 receives at the other input terminal the output signal of the polarity detector 62, supplying its output signal to the analog switch SW10. That is, when the pulse P3 and a high-level signal are produced from the step counter 66 and the polarity detector 62, respectively, a high-level output signal is supplied from the AND gate 72 to the analog switch SW10, and the switch SW10 is closed. When the pulse P3 and a low-level signal are produced from the step counter 66 and the polarity detector 62, respectively, a high-level output signal is supplied from the AND gate 70 to the analog switch SW16, and the switch SW16 is closed.

Now there will be described the operation of the electronic weight measuring device shown in FIG. 1.

Figure 3:
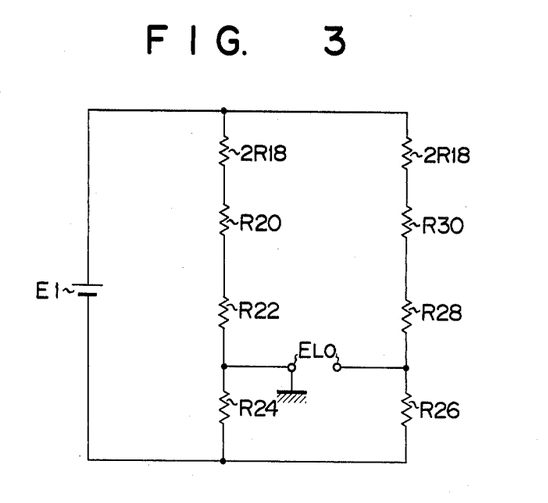
FIG. 3 is an equivalent circuit diagram of a load cell of the electronic weight measuring circuit of FIG. 1.

As is clear from the drawing of FIG. 3 which shows the equivalent circuit of the load cell 2, a no-load output voltage $E_{LO}$ of the load cell 2 may be given as follows:

$$E_{LO} = E_1 \left( \frac{R26}{2R18 + R30 + R28 + R26} - \frac{R24}{2R18 + R20 + R22 + R24} \right) \quad (1)$$

If $R22 = R24 = R26 = R\infty = R$ and the variation of resistances R22, R24, R26 and R28 with a load F applied to the load cell 2 is $\Delta R$, an output voltage $E_{LF}$ of the load cell 2 will be $$F_{LF} = E1 \left\{ \frac{R(1 - \Delta R)}{2R18 + R30 + R(1 + \Delta R) + R(1 - \Delta R)} - \frac{R(1 + \Delta R)}{2R18 + R20 + (1 + \Delta R) + R(1 - \Delta R)} \right\} \quad (2)$$

If R20=R30, eq. (2) may be modified as follows:

$$E_{LF} = E1 \times \frac{-2R \cdot \Delta R}{2R18 + R30 + 2R} \quad (3)$$

Being in proportion to the load F, the resistance variation $\Delta R$ is given by $$R = \frac{F}{F_0} \cdot K \quad (4)$$

where F is the rated load and K is the sensitivity of the load cell 2. Substituting eq. (4) into eq. (3), we obtain $$E_{LF} = \frac{-2R}{2R18 + R30 + 2R} \cdot \frac{F}{F_0} \cdot K \cdot E1 = \quad (5)$$

$$-P \cdot \frac{F}{F_0} \cdot K \cdot E1$$

Here $P = \frac{2R}{2R18 + R30 + 2R}$ (=constant).

The output voltage $E_{LF}$ of the load cell 2 is cleared of the AC component superimposed thereon by the low-pass filter 32 of the signal processor circuit 3.

When the analog switches SW4, SW8, SW12, SW14 and SW18 are closed by the switch controller 6 at time t1, a bias voltage V14 set by the potentiometer 14 is applied to the noninverted input terminal of the operational amplifier 34. Applied to the inverted input terminal of the operational amplifier 34 is its own offset voltage V34, the output voltage VO1 of the amplifier 34 being $$VO1 = A_1(V34 - V14) \quad (6)$$

Here $A_1$ is the amplification factor of the operational amplifer 34 and $$A_1 = \left(1 + \frac{R36}{R38}\right).$$

The capacitor C1 is charged with the output voltage V01 of the operational amplifier 34 through the resistor R40 and switch SW8.

If the amplification factor of the operational amplifiers 10 and 12 is $A_2 = R8/R6$ and the offset voltages of the amplifiers 10 and 12 are V10 and V12, respectively, the output voltage V02 of the amplifier 12 is $$VO = -(1 + A_2)(E1 + V12 - V10) \quad (7)$$

Therefore, the reference voltage $-Vr$ supplied from the power circuit 1 to the A/D converter circuit 4 is $$-Vr = (1 + A_2)(E1 + V12 - V10) \cdot \frac{R16}{R14 + R16} \quad (8)$$

Accordingly, when the analog switches SW12 and SW14 are closed at time t1, the reference voltage $-Vr$ is applied across the capacitor C2 with the polarity as shown.

Since the analog switch SW18 is closed at time t1, there is formed a negative feedback loop from the output terminal of the operational amplifier 48 to the noninverted input terminal of the operational amplifier 44 of the integration circuit 46 through the analog switch SW18. Thus, the negative feedback loop functions so as to always keep the differential input voltage to the operational amplifier 44 at the zero, interrupting the integrating operation of the integration circuit 46. Such state is maintained until time t2, that is, for period T1.

At time t2 the analog switches SW4, SW8, SW12, SW14 and SW18 are opened, and the analog switches SW2 and SW6 are closed instead. As a result, the output voltage $E_L$ of the load cell 2 is amplified by the operational amplifier 34, so that the output voltage V01 of the amplifier 34 becomes $$VO1 = A_1(E_L + V34) \quad (9)$$

Meanwhile, the capacitor C1 is charged with the voltage $\{A_1(V34-V14)\}$ in period T1 and such charging voltage is maintained because the analog switch SW8 is open, so that the otput voltage Vos of the signal processor circuit 3 is $$VOs = A_1(-E_L + V34) - A_1(V34 - V14) = -A_1 \cdot (E_L - V14) \quad (10)$$

Namely, this indicates that the effect of the offset voltage V34 of the operational amplifier 34 is eliminated. Further, the no-load output voltage of the signal processor circuit 3 or the input voltage to the A/D converter circuit 4 may optionally be set at a positive or negative value by suitably setting the potentiometer 14. The input voltage to the A/D converter circuit 4 may change from positive to negative or from negative to positive in proportion to the load applied to the load receiving portion. In this example the no-load input voltage to the A/D converter circuit 4 is set at a positive value, changing from positive to negative in proportion to the load.

Since the capacitor C2 is charged with the voltage $-Vr$, the noninverted input terminal of the operational amplifier 42 is supplied with an input signal voltage $V_{i1}$ given as follows:

$$V_{i1} = -Vr - A_1(E_L - V14) \quad (11)$$

This input signal voltage $V_{i1}$ is supplied through the buffer amplifier 42 and resistor R42 to the integration circuit 46, where it is integrated.

The capacitor C3 is supplied with a voltage $(-Vr + V44)$ (here V44 is the offset voltage of the operational amplifier 44) in period T1. In period T2, a signal voltage $\{-Vr - A_1(E_L - V14) + V44\}$ is supplied to the inverted input terminal of the operational amplifier 44, where an output voltage V02 is produced as follows:

$$VO = [\{-Vr - A_1(E_L - V14) + V44 - (-Vr + V44)\}] \times A_3 = -A_1 \cdot A_3(E_L - V14) \quad (12)$$

Here $A_3$ is the amplification factor of the operational amplifier 44.

As is clear from eq. (12), obtained from the operational amplifier 44 may be a signal corresponding to the output signal from the load cell 2.

The integrating operation at the integration circuit 46 is executed from time t2 until the time t3, that is, for period T2, and the output signal of the integration circuit 46 is supplied to the inverted input terminal of the operational amplifier 48.

The polarity detector circuit 62 of the control circuit 6 receives the output signal from the operational amplifier 48 immediately before time t3, and decides from the level of the output signal whether the integration output signal at the integration circuit 46 is positive or negative. By this it is decided whether the voltage signal supplied from the capacitor C2 to the noninverted input terminal of the buffer amplifier 42 is positive or negative. When the polarity detector circuit 62 detects from the output signal of the operational amplifier 48 that the integration output signal of the integration circuit 46 is negative, the analog switch SW16 is given an excitation pulse though the inverter 74 and AND gate 70 and closed at time t3. At the same time the analog switches SW2 and SW6 are opened. Thus, a voltage at 0V is applied to the inverted input terminal of the operational amplifier 44, and the output voltage V02N of the integration circuit 46 rises up to 0V at a substantially fixed rate, as shown in FIG. 2. When the zero level detector 64 detects that the output voltage V02N has reached 0V, it energizes the latch circuit 56 via the AND gate 68, thereby storing the content of the main counter 54 in the latch circuit 56. Since periods T1 and T2 are fixed, it is easy to calculate the number of clock pulses counted by the counter 54 from time t3 until the voltage V02N attains 0V, that is, for period T4. The memory information signal of the latch circuit 56 and the output signal from the polarity detector 62, which indicates that the output voltage of the signal processor circuit 3 is positive, are delivered to the microprocessor 58. The microprocessor 58 processes the information stored in the latch circuit 56 and the polarity indicating signal from the polarity detector 62 in accordance with a predetermined program, and supplies the display unit 59 with a weight indicating signal corresponding to the load applied.

Meanwhile, when the polarity detector circuit 62 detects that the output voltage of the integration circuit 46 is positive, it produces a high-level signal. This high-level signal is applied to the analog switch 10 through the AND gate 72 in period T3 to close the switch SW10. In this case the capacitor C2 holds the voltage $-Vr$, so that a voltage $-2 Vr$ is to be applied to the input terminal of the operational amplifier 44. Since the voltage signal applied to the inverted input terminal of the amplifier 44 has a polarity opposite to that of the present output signal of the integration circuit 46, the output voltage V02P of the integration circuit 46 reduces toward 0V at a substantially fixed rate, as shown in FIG. 2. When the zero level detector 64 detects that the output voltage V02O—and hence the output voltage of the operational amplifier 48—has reached 0V, it energizes the latch circuit 56 via the AND gate 68, thereby storing the content of the main counter 54 in the latch circuit 56. Like the foregoing case, it is easy to calculate the number of clock pulses counted by the counter 54 from time t3 until the voltage V02P attains 0V, that is, for period T5. The count information stored in the latch circuit 56 and the output signal from the polarity detector 62, which indicate that the output voltage of the signal processor circuit 3 is negative, are delivered to the microprocessor 58, from which a weight indicating signal corresponding to the load is supplied to the display unit 59.

If the charging voltage of the capacitor C4 is 0V at time t2, the output voltage V022 of the integration circuit 46 in period T2 is $$V022 = -\frac{1}{C4} \int_{t_2}^{t_3} -\left(\frac{A_1 \cdot E_L}{R42}\right) \cdot dt \qquad (13)$$
$$= \frac{A_1 \cdot E_L}{C4 \cdot R42} \cdot T2.$$

Further, the output voltage V023 of the integration circuit 46 in period T4 or T5 is $$V023 = -\frac{1}{C4} \int_{t_3}^{t_4} \left(\frac{Vr}{R42}\right) \cdot dt \qquad (14)$$
$$= \frac{-Vr}{C4 \cdot R42} \cdot T4.$$

Here VO22=V023, and then $$\frac{A_1 \cdot E_L}{C4 \cdot R42} \cdot T2 = \frac{-Vr}{C4 \cdot R42} \cdot T4. \qquad (15)$$

Transforming eq. (15), we obtain $$T4 = -\frac{A_1 \cdot E_L}{Vr} \cdot T2. \qquad (16)$$

Substituting eqs. (5) and (8) into eq. (16), we obtain $$T4 = \frac{A_1 \cdot P \cdot \frac{F}{F0} \cdot K \cdot E1}{(1 + A_2)(E1 + V12 - V10) \cdot \frac{R16}{R14 + R16}} \qquad (17)$$

If (V12-V10) is smaller enough as compared with a voltage corresponding to one count on the counter 54, T4 will be $$T4 = \frac{A_1}{1 + A_2} \cdot RKT2\left(1 + \frac{R14}{R16}\right) \cdot \frac{F}{F0} \qquad (18)$$

As may be clear from eq. (18), period T4 is proportional to the load F.

In this embodiment the A/D converter circuit 4 is so constructed as to be able to process positive and negative input voltages, so that it is advisable to adjust the potentiometer 14 so that the input voltage supplied to the A/D converter circuit 4 may become zero when ½ of the rated load F0 is applied.

According to eqs. (5) and (10), the input voltage Vos to the A/D converter circuit 4 may be given by $$Vos = -A_1\left(P \frac{F}{F0} K E1 + V14\right). \qquad (19)$$

Substituting F=F0/2 into eq. (19), we obtain $$Vos = -A_1(\tfrac{1}{2}PK\ E1 + V14) \qquad (20)$$

Figure 4:
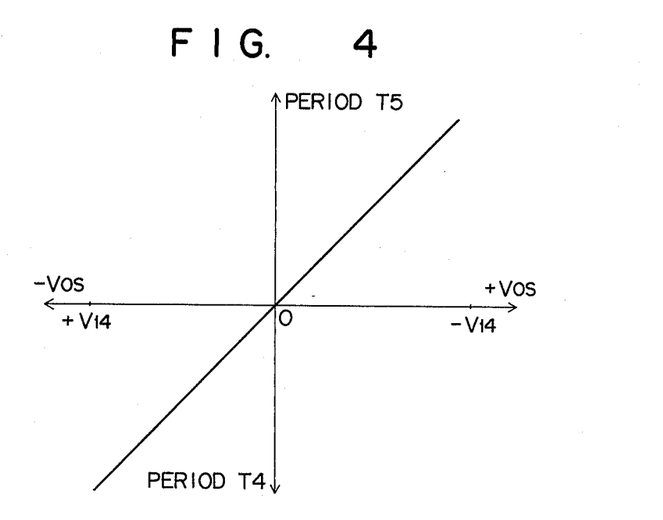
FIG. 4 shows the input-output characteristic of an A/D converter circuit included in the electronic weight measuring circuit of FIG. 1.

Accordingly, the potentiometer 14 should be so adjusted that V14=−½ PK E1. In this case, as is clear from eq. (20), the input voltage Vos to the A/D converter circuit 4 is equal to −V14 when no load is applied, while it becomes +V14 when the rated load F0 is applied. That is, when the load varies from 0 to F0, the voltage Vos changes linearly from −V14 (positive) to +V14 (negative). Periods T4 and T5 of the output signal of the integration circuit 46 change linearly in relation to the input voltage Vos to the A/D converter circuit 4, as shown in FIG. 4.

In the weight measuring device shown in FIG. 1, the output voltage of the operational amplifier 12 is divided by the resistors R14 and R16, and the divided voltage is supplied to the operational amplifier 42 through the analog switch SW10 or SW14, which will, however, fix the maximum value of the reference voltage supplied to the A/D converter circuit 4, preventing adjustment of the sensitivity (output voltage/input voltage) of the A/D converter circuit 4.

Figure 5:
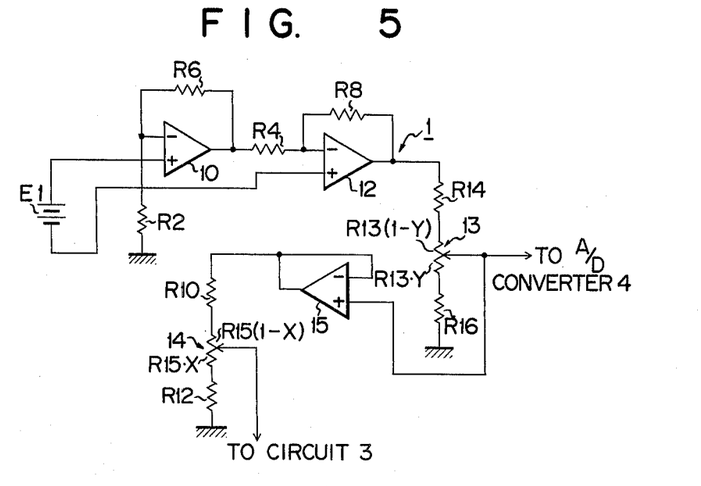
FIG. 5 shows an alternative example of the power circuit as used with the electronic weight measuring circuit of FIG. 1.

FIG. 5 shows the power circuit 1 cleared of the aforesaid defect.

Referring now to FIG. 5, there is shown a potentiometer 13 connected between the resistors R14 and R15, the movable terminal of the potentiometer 13 being connected with the analog switches SW10 and SW14 of the A/D converter circuit 4. Also, the movable terminal of the potentiometer 13 is connected with the noninverted input terminal of an operational amplifier 15. The inverted input terminal of the operational amplifier 15 is connected with the output terminal thereof, which is earthed through the resistor R10, potentiometer 14, and the resistor R12. The movable terminal of the potentiometer 14 is connected with the junction of the resistor R34 and switch SW4 of the signal processor circuit 3, in the same manner as in FIG. 1.

If the power source circuit as shown in FIG. 5 is used instead of using the power source circuit of FIG. 1, no-load period T5 will be $$T5 = \frac{A_1\{E_{LF} \pm E_{LB} - (A_2 \cdot E_1 \cdot Rr)(A_3 \cdot Rw)\}}{A_2 \cdot E_1 \cdot Rr} \cdot T1 \quad (21)$$

$$= \{\frac{A_1(E_{LF} \pm E_{LB})}{A_2 \cdot E_1 \cdot Rr} \cdot T1\} - (A_1 \cdot A_3 \cdot Rw \cdot T1).$$

Here $E_{LB}$ is a zero balance voltage controlled by the resistance R20, Rw and Rr are resistances adjusted by the potentiometers 14 and 13, respectively, Rw=(R10+R15X)/(R10+R15+R12) (refer to FIG. 5 for R15 and R15X), Rr=(R14+R13Y)/(R14+R13+R16) (refer to FIG. 5 for R13 and R13Y), E1·Rw is a voltage which is supplied to the A/D converter circuit 4 for setting no-load period T5, and $A_3$ is the amplification factor of the operational amplifier 12.

In eq. (21), $$\{\frac{A_1(E_{LZ} \pm E_{LB})}{A_2 \cdot E1 \cdot Rr} \times T1\}$$

is a term related to the output voltage of the load cell 2, while $(A_1 \cdot A_3 \cdot Rw \cdot T1)$ is a term related to the voltage applied to the A/D converter circuit 4 for setting no-load period T5, the former being far larger than the latter. Since the latter does not include Rr, it will be kept at a fixed value if R13Y is changed by operating the potentiometer 13. In the former term, $E_{LZ}$ is the output voltage from the load cell 2 generated by the weight of load receiving plate and the like. $E_{LB}$ is the output voltage from the load cell 2 by zero balancing, and we may obtain $E_{LO} \pm E_{LB} = 0$ by suitably adjusting the resistor R20. To obtain $E_{LO} \pm E_{LB} = 0$ means to set the output voltage of the load cell 2 at 0V where the device is equipped with the load receiving plate and the like.

Thus, by adjusting the potentiometer 13, the value of no-load period T5 may be maintained substantially constant without being largely effected by the change of the sensitivity of the A/D converter circuit 4, if any.

Figure 6:
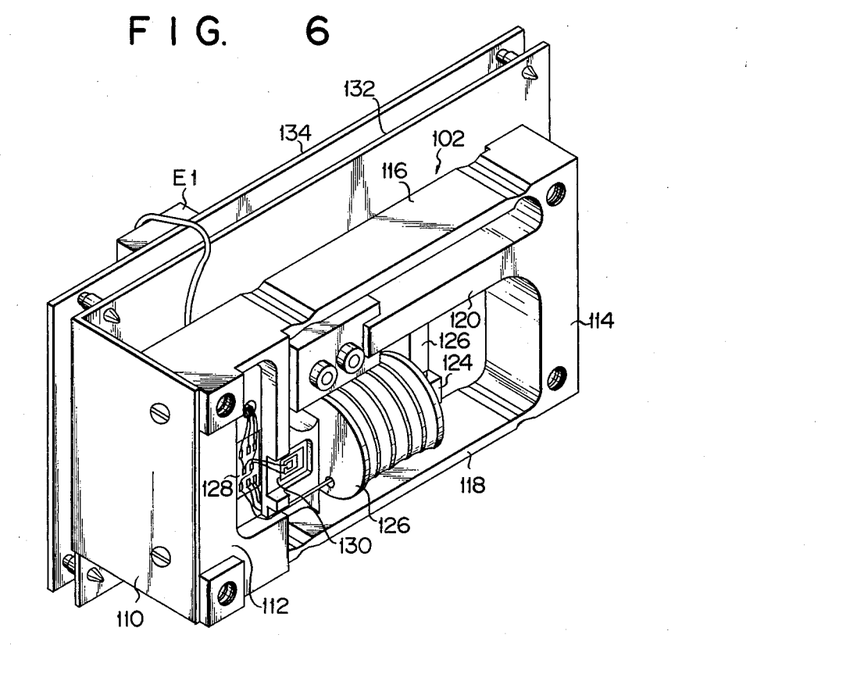
FIGS. 6 to 8 are schematic views showing the actual configuration of the electronic weight measuring circuit of FIG. 1.
Figure 7:
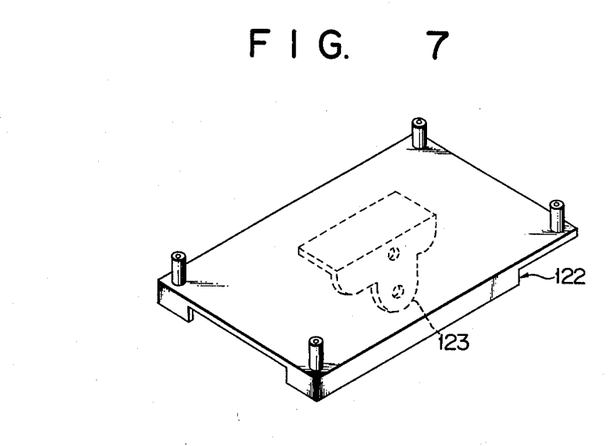
Figure 8:
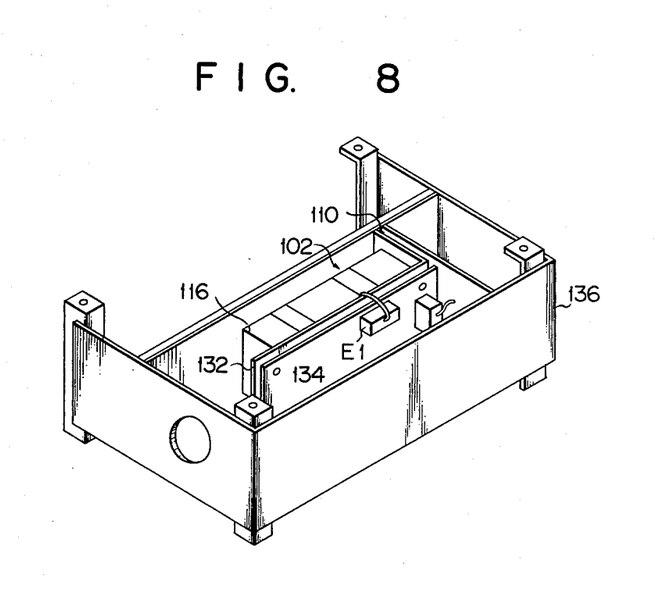

FIGS. 6 to 8 are diagrams illustrating the actual configuration of the electronic weight measuring circuit as shown in FIG. 1.

Referring now to FIG. 6, there is shown a load cell 102 which includes a fixed portion 112 fixed to a support plate 110, a movable portion 114, upper and lower beinding elements 116 and 118 disposed between the fixed portion 112 and movable portion 114, and a middle bending element 120 extending from the movable portion 114 in parallel with the bending elements 116 and 118. Formed in the movable portion 114 are threaded holes for setting a load receiver portion 122 as shown in FIG. 7, the load receiver portion 122 being attached by passing screws through such holes as well as through threaded holes formed in a fitting member 122 on the load receiver portion 112. From the fixed portion 112 extends a bending arm 124, and tip end of which hits against a pin 126 extending downward from the middle bending element 120. Stuck to the middle portion, for example, of the bending arm 124 are the resistors R20, R22, R24, R26, R28 and R30 of the load cell 2 as shown in FIG. 1. The portion of the bending arm 124 to which the resistors (not shown) are stuck is sealed with a flexible container 126. The resistors stuck to the bending arm 124 are connected with a resistor 130, which is equivalent to the resistors R18, R20 and R30 (FIG. 1) and is formed of e.g. a ladder type resistor circuit, through a terminal connecting portion 128, as well as with the power source E1.

Mounted on another support plate 132 extending at right angles to the support plate 110 is a printed circuit board 134 which includes the signal processor circuit 3, A/D converter circuit 4, counter/display circuit 5, and the control circuit 6 as shown in FIG. 1.

The circuit components as shown in FIG. 6 are contained in a case 136 as shown in FIG. 8.

The no-load output voltage of the load cell 102 can be set at a predetermined value by adjusting the resistor 130 with the load receiving plate 122 of FIG. 7 attached to the load cell 102 as shown in FIG. 6. When a load is applied to the load receiving plate 122, the upper and lower bending elements 116 and 118 are so bent as to move the movable portion 114 downward as in FIG. 6. Thus, the pin 126 moves downward to press down the bending arm 124. As a result, the bending arm 124 is bent, thereby changing the resistances of the resistors stuck to the bending arm 124. Produced from the load cell 102 is an output voltage in accordance with the variation of these resistance values, which is supplied to the printed circuit board 134.

Since the resistor 130 is disposed opposite to the printed circuit board 134 and is exposed to outside, it is easily accessible so that the resistor 130 can be adjusted to minimize the effect due to variation in temperature characteristics of both the load cell 102 and printed circuit board 134. Moreover, the resistors R22, R24, R26 and R28 as shown in FIG. 1 are arranged in close vicinity to the printed circuit board 134 including the power source circuit 1, signal processor circuit 3, A/D converter circuit 4, counter/display circuit 5, and the control circuit 6, so that the whole circuit is subject to the same temperature condition, allowing full temperature compensation with respect to the whole circuit to be achieved by only adjusting the resistor 130.

Where, for example, variations of the sensitivities of the load cell 102 and printed circuit board 134 to the temperature mutually vary in a linear way, the resistor 130 or 18 (FIG. 1) is so adjusted that such variations can be made equal in magnitude, but opposite in sign, to each other, enabling the variation of the sensitivity of the circuit as a whole to the temperature to be suppressed to a minimum, for example below 10 PPM/° C.

Such a temperature compensation will be set out in more detail.

In Equation (18), since factors $A_1$, $A_2$, P, K, R14 and R16 vary with temperature the variation of the sensitivity to the temperature, of the whole circuit including the load cell 102 and printed circuit board 134 can be expressed as follows:

$$\frac{\Delta T4}{T4} = \frac{1}{T4}\left[\frac{\delta T4}{\delta A_1} \cdot dA_1\right] + \frac{1}{T4}\left[\frac{\delta T4}{\delta A_2} \cdot dA_2\right] + \quad (22)$$
$$\frac{1}{T4} \cdot \left[\frac{\delta T4}{\delta P} \cdot dP\right] + \frac{1}{T4}\left[\frac{\delta T4}{\delta K} \cdot dK\right] +$$
$$\frac{1}{T4}\left[\frac{\delta T4}{\delta R14} \cdot R14\right] + \frac{1}{T4}\left[\frac{\delta T4}{\delta R16} \cdot dR16\right]$$

with $$\frac{\delta T4}{\delta A_1} = a_1, \frac{\delta T4}{\delta A_2} = a_2, \frac{\delta T4}{\delta P} = P, \frac{\delta T4}{\delta K} = K,$$
$$\frac{\delta T4}{\delta R14} = R10 \text{ and } \frac{\delta T4}{\delta R16} = R20.$$

Equation (13) will be given as follows:

$$\frac{\Delta T4}{T4} = \frac{1}{T4}\{a_1 dA_1 + a_2 dA_2 + R10 \cdot dR14 + \quad (23)$$
$$R20 \cdot dR16) + (pdP + kdK)\}$$

In Equation (23), the first term $a_1 dA_1 + a_2 dA_2 + R10 \cdot dR14 + R20 \cdot dR16$ denotes the variation per 1° C. of output voltage of the reference voltage supply 1 and DC amplifier 3, and the second term $pdP + kdK$ denotes the variation of the load cell 2. Factor of $dA_1$, $dA_2$, dR14, dR16, dp and dk indicate the temperature sensitivity coefficient (PPM/° C.) of the corresponding parts. If, therefore, dp of the load cell 2, particularly the resistor R18, is so adjusted that the variation of the second term with temperature change can be made equal in its absolute value, but opposite in sign, to the variation of the first term, with temperature change the variation in an input to thd A/D converter with temperature change can be easily made approximately zero. With a conventional apparatus, it has been very difficult to adjust the temperature sensitivity constant of the whole circuit down to 10 PPM/° C. and it is necessary to use expensive, accurate parts. According to this invention, on the other hand, the whole circuit can be regarded as a single part and the temperature sensitivity coefficient can be easily adjusted down to 10 PPM/° C. Furthermore, it is not necessary to pay particular attention to the accuracy of each part and an improvement can be attained from the economic standpoint. Although the zero point temperature coefficient is somewhat varied by adjusting the temperature sensitivity coefficient, such adjustment can be easily effected since a zero point adjustment resistor R30 can be used as well as the resistor R18.

Although an illustrative embodiment of this invention has been described in detail herein with reference to the accompanying drawings, it is to be understood that the invention is not limited to such precise embodiment. For example, a high resistance may be used instead of using the operational amplifier 15 which forms the high impedance circuit in FIG. 5.

What we claim is:

1. An electronic weight measuring device comprising:
   a power source terminal;
   a load cell connected to said power source terminal and producing an output signal corresponding to the weight of a load to be measured within a predetermined measuring range;
   a signal processor circuit coupled to said load cell for processing the output signal of said load cell and producing a further output signal corresponding to said load cell output signal;
   a reference voltage terminal;
   bias means including a first amplifier circuit having an output terminal; a potentiometer having a movable terminal connected to an input terminal of said signal processor circuit and end terminals respectively connected to said output terminal of said first amplifier circuit and said reference voltage terminal and a resistance type voltage divider circuit connected between said output terminal of said first amplifier circuit and said reference voltage terminal; said bias means supplying said signal processor circuit with a bias voltage for setting the varying range of the output signal of said signal processor circuit corresponding to said measuring range to a range defined by positive and negative values;
   an analog-to-digital converter means connected to the output of said signal processor circuit and to said resistance type voltage divider circuit for converting said output signal of said signal processor circuit into a digital signal in accordance with an output signal of said resistance type voltage divider circuit; and
   a load indicating signal generator circuit coupled to the output of said analog-to-digital converter means for deriving a load indicating output signal to indicate said load to be measured from the output signal of said analog-to-digital converter means.

2. An electronic weight measuring device according to claim 1, wherein said load cell is adjusted to produce an output voltage of zero volts when no load to be measured is applied.

3. An electronic weight measuring device according to claim 1, wherein said load cell and bias means are connected to a common power source terminal.

4. An electronic weight measuring device according to claim 1, wherein said load cell is formed of a resistance type bridge circuit having resistors whose resistances vary with distortion force applied thereto; and a further resistor connected between said resistance type bridge circuit and said power source terminal.

5. An electronic weight measuring device according to claim 1, wherein said voltage divider circuit comprises a series circuit of first and second resistors, the output terminal of said voltage divider circuit being taken out from the junction of said first and second resistors.

6. An electronic weight measuring device according to claim 1, wherein said potentiometer applies to the input terminal of said signal processor circuit such a bias voltage that reduces the output signal of said signal processor circuit to zero when said signal processor circuit has been supplied with an output voltage produced from said load cell in accordance with ½ of the limit of said measuring range.

7. An electronic weight measuring device according to claim 1, wherein said analog-to-digital converter means includes:
   a reference voltage generator circuit connected between an output terminal of said resistance type voltage divider circuit and said reference voltage terminal for superposing the reference voltage on the output signal from said signal processor circuit;
   an integration circuit for integrating the output signal of said reference voltage generator circuit; and
   a comparator circuit for comparing the output signal of said integration circuit with a first reference signal and for generating a comparison output signal.

8. An electronic weight measuring device according to claim 7, wherein said reference voltage generator circuit includes:
   a capacitor;
   a first switch connected between one end of said capacitor and an output terminal of said voltage divider circuit; and
   a second switch connected between the other end of said capacitor and said reference voltage terminal for supplying the reference voltage from said other end of said capacitor to said integration circuit;
   said weight measuring device further comprising a control circuit for controlling said first and second switches so as selectively to close said first and second switches in accordance with the polarity of the output signal of said comparator circuit.

9. An electronic weight measuring device according to claim 1, wherein said signal processor circuit includes:
   a second amplifier circuit having an input and an output;
   a first switch connected between the output of said load cell and the input of said second amplifier circuit;
   a second switch connected between said movable terminal of said potentiometer of said bias means and the input of said second amplifier circuit; and
   a capacitor connected between the output of said second amplifier circuit and the input of said analog-to-digital converter means.

10. An electronic weight measuring device according to claim 9, wherein said analog-to-digital converter means includes:
    a second capacitor having first and second terminals, said first terminal being connected with the first capacitor of said signal processor circuit;
    third and fourth switches connected respectively between the output of said resistance type voltage divider circuit of said bias means and said first and second terminals of said second capacitor;
    fifth and sixth switches connected respectively between said reference voltage terminal and said first and second terminals of said second capacitor;
    an integration circuit having an input terminal connected to said second terminal of said second capacitor; and
    a comparator circuit for comparing an output signal of said integration circuit with the reference signal.

11. An electronic weight measuring device according to claim 1, wherein said bias means, signal processor circuit, and analog-to-digital converter means are formed on a single printed circuit board, and further comprising a case to contain said printed circuit board and said load cell.

12. An electronic weight measuring device according to claim 11, wherein said load cell is disposed in close vicinity to and opposite to said printed circuit board.

13. An electronic weight measuring device according to claim 12, wherein said load cell comprises a resistance type bridge circuit having resistors whose resistances vary with distortion force applied thereto and a further resistor connected between said resistance type bridge circuit and said power source terminal, said further resistor being exposed outside on the opposite side with respect to said printed circuit board.

14. An electronic weight measuring device comprising:
    a power source terminal;
    a load cell connected to said power source terminal and producing an output signal corresponding to the weight of a load to be measured within predetermined measuring range;
    a signal processor circuit coupled to said load cell for processing the output signal of said load cell and producing a further output signal corresponding to said load cell output signal;
    a reference voltage terminal;
    bias means including an amplifier circuit having an output terminal; a first potentiometer connected between said output terminal of said amplifier circuit and said reference voltage terminal, said first potentiometer having a movable terminal; a high impedance element connected to said movable terminal of said first potentiometer; and a second potentiometer connected between said high impedance element and said reference voltage terminal and having a movable terminal coupled to the input of said signal processor circuit; said bias means supplying said signal processor circuit with a bias voltage for setting the varying range of the output signal of said signal processor circuit corresponding to said measuring range to a range defined by positive and negative values;
    an analog-to-digital converter means connected to the output of said signal processor circuit and to said movable terminal of said first potentiometer for converting said output signal of said signal processor circuit into a digital signal in accordance with an output signal from said movable terminal of said first potentiometer; and
    a load indicating signal generator circuit coupled to the output of said analog-to-digital converter means for deriving a load indicating output signal to indicate said load to be measured from the output signal of said analog-to-digital converter means.

15. An electronic weight measuring device according to claim 14, wherein said second potentiometer applies to the input terminal of said signal processor circuit such a bias voltage that reduces the output signal of said signal processor circuit to zero when said signal processor circuit has been supplied with an output voltage produced from said load cell in accordance with ½ of the upper limit of said measuring range.

16. An electronic weight measuring device according to claim 14, wherein said analog-to-digital converter means includes:
    a reference voltage generator circuit connected between said movable terminal of said first potentiometer and said reference voltage terminal for superposing the reference voltage on the output signal from said signal processor circuit;

an integration circuit for integrating the output signal of said reference voltage generator circuit; and a comparator circuit for comparing the output signal of said integration circuit with a first reference signal and for generating a comparison output signal.

17. An electronic weight measuring device according to claim 16, wherein said reference voltage generator circuit includes:

a capacitor;

a first switch connected between one end of said capacitor and said movable terminal of said first potentiometer; and a second switch connected between the other end of said capacitor and said reference voltage terminal for supplying the reference voltage from said other end of said capacitor to said integration circuit;

said weight measuring device further comprising a control circuit for controlling said first and second switches so as selectively to close said first and second switches in accordance with the polarity of the output signal of said comparator circuit.

18. An electronic weight measuring device according to claim 14, wherein said signal processor circuit includes:

a second amplifier circuit having an input and an output;

a first switch connected between the output of said load cell and the input of said second amplifier circuit;

a second switch connected between said movable terminal of said second potentiometer of said bias means and the input of said second amplifier circuit; and a capacitor connected between the output of said second amplifier circuit and the input of said analog-to-digital converter means.

19. An electronic weight measuring device according to claim 18, wherein said analog-to-digital converter means includes:

a second capacitor having first and second terminals, said first terminal being connected with the first capacitor of said signal processor circuit;

third and fourth switches connected respectively between said movable terminal of said first potentiometer of said bias means and said first and second terminals of said second capacitor;

fifth and sixth switches connected respectively between said reference voltage terminal and said first and second terminals of said second capacitor;

an integration circuit having an input terminal connected to said second terminal of said second capacitor; and a comparator circuit for comparing an output signal of said integration circuit with the reference signal.

20. An electronic weight measuring device according to claim 14, wherein said bias means, signal processor circuit, and analog-to-digital converter means are formed on a single printed circuit board, and further comprising a case to contain said printed circuit board and said load cell.

21. An electronic weight measuring device according to claim 20, wherein said load cell is disposed in close vicinity to and opposite to said printed circuit board.

22. An electronic weight measuring device according to claim 21, wherein said load cell comprises a resistance type bridge circuit having resistors whose resistances vary with distortion force applied thereto and a further resistor connected between said resistance type bridge circuit and said power source terminal, said further resistor being exposed outside on the opposite side with respect to said printed circuit board.

* * * * *

UNITED STATES PATENT AND TRADEMARK OFFICE
CERTIFICATE OF CORRECTION

PATENT NO. : 4,158,396
DATED : June 19, 1979
INVENTOR(S) : Seiji SUZUKI et al

It is certified that error appears in the above–identified patent and that said Letters Patent are hereby corrected as shown below:

Column 1, line 59, change heading to read
 --BRIEF DESCRIPTION OF THE DRAWINGS--;

Column 12 (claim 4), line 53, change "is formed of"
 to --comprises--.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*